US010753120B2

(12) United States Patent
Reeder et al.

(10) Patent No.: US 10,753,120 B2
(45) Date of Patent: Aug. 25, 2020

(54) QUICK ASSEMBLY TENT

(71) Applicant: Sylvansport, LLC, Brevard, NC (US)

(72) Inventors: Thomas W. Reeder, Fletcher, NC (US); Thomas M. Dempsey, Cedar Mountain, NC (US); Gregory K. Mundt, Asheville, NC (US)

(73) Assignee: Sylvansport, LLC, Brevard, NC (US)

( * ) Notice: Subject to any disclaimer, the term of this patent is extended or adjusted under 35 U.S.C. 154(b) by 0 days.

(21) Appl. No.: 16/512,087

(22) Filed: Jul. 15, 2019

(65) Prior Publication Data

US 2020/0048926 A1  Feb. 13, 2020

Related U.S. Application Data

(60) Provisional application No. 62/698,566, filed on Jul. 16, 2018.

(51) Int. Cl.
| | |
|---|---|
| *E04H 15/06* | (2006.01) |
| *E04H 15/38* | (2006.01) |
| *E04H 15/54* | (2006.01) |
| *E04H 15/00* | (2006.01) |
| *E04H 15/60* | (2006.01) |
| *E04H 15/64* | (2006.01) |

(52) U.S. Cl.
CPC ............ *E04H 15/38* (2013.01); *E04H 15/54* (2013.01); *E04H 15/008* (2013.01); *E04H 15/60* (2013.01); *E04H 15/646* (2013.01)

(58) Field of Classification Search
CPC ....... E04H 15/38; E04H 15/48; E04H 15/008; E04H 15/06
See application file for complete search history.

(56) References Cited

U.S. PATENT DOCUMENTS

| | | | | | |
|---|---|---|---|---|---|
| 3,093,150 | A | * | 6/1963 | Schaftener | B60P 3/38 135/88.17 |
| 3,375,836 | A | * | 4/1968 | Domeneghetti | E04H 15/06 135/88.18 |
| 4,396,030 | A | * | 8/1983 | Ferguson | E04H 15/06 135/88.17 |
| 4,522,441 | A | * | 6/1985 | Allison | B60P 3/38 135/88.17 |
| 6,035,875 | A | * | 3/2000 | Chen | E04H 15/06 135/88.05 |
| 9,546,500 | B2 | * | 1/2017 | Choi | E04H 15/46 |
| 10,119,296 | B2 | * | 11/2018 | Deal | E04H 15/02 |
| 2006/0054208 | A1 | * | 3/2006 | Romano | E04H 15/38 135/132 |
| 2010/0263698 | A1 | * | 10/2010 | Chiu | E04H 15/06 135/88.17 |

* cited by examiner

*Primary Examiner* — Noah Chandler Hawk
(74) *Attorney, Agent, or Firm* — F. Michael Sajovec; Doug Tsao; Williams Mullen

(57) ABSTRACT

A quick assembly tent is provided which may be quickly assembled and disassembled without using any tools or requiring know-how by the user. The tent includes a dynamic platform that can rotate about an x-axis along a platform pivot from a closed position to an open position. The tent may be configured to be mounted on a vehicle. The tent may include a rain fly and an entry ladder. The tent may be configured to deploy simply by pivoting the dynamic platform from a closed to an open position. Methods for assembling a quick assembly tent are also provided.

12 Claims, 26 Drawing Sheets

QUICK ASSEMBLY TENT

RELATED APPLICATIONS

The following application claims priority to U.S. Provisional No. 62/698,566 filed Jul. 16, 2018, the disclosure of which is incorporated by reference in its entirety.

FIELD

The present disclosure relates to a quick assembly tent, and more particularly to a quick assembly roof top tent that may be assembled and disassembled without using any tools or requiring substantial know-how by the user.

BACKGROUND

Camping is a popular outdoor activity. Manufacturers of tents are called upon to offer inexpensive and easy-to-assemble tents to consumers. Current tents have undesirable qualities such as complicated or slow set-up, being bulky and not easy to store, and requiring many loose parts, such as poles and stakes, also to be stored. The consumer often must possess the necessary know-how to assemble the tent components. This means being able to read and follow any assembly instructions sent with the components. At times, these assembly instructions may be complicated and/or confusing, even if preparation of those instructions is given substantial consideration by the manufacturer. At times, the assembly instructions may not be included with the tent or may be lost during shipment or with use. These situations may lead to the consumer adopting a trial-and-error method to determine the correct configuration of the components. The consumer may become undesirably frustrated, and waste time and energy building the wrong configuration.

There remains a need to simplify the process of assembling and dissembling tents. There also remains a need for tents that can be stored in an easy and compact manner.

BRIEF SUMMARY

The present disclosure relates to a quick assembly tent which may be quickly assembled and disassembled without using any tools or requiring substantial know-how by the user. Under the present approach, the tent includes a dynamic platform that can rotate about a platform pivot axis from a closed position to an open position. Although specific embodiments of the present approach are described herein, it should be appreciated that the various components, configurations, and features may be combined to form other embodiments not shown herein but nonetheless not depart from the present approach.

In the demonstrative embodiment disclosed herein, the tent assembly may include a back tent wall, a front tent wall, two side tent walls, a top tent wall, and a platform assembly that includes a static platform and a dynamic platform coupled together at a platform pivot. In some embodiments, the dynamic platform may be configured to pivot about the platform pivot from a closed position wherein the dynamic platform may be disposed substantially above the static platform, to an open position wherein the dynamic platform may be disposed substantially adjacent the static platform such that the dynamic platform and static platform together form a tent bottom surface. In some embodiments, the tent assembly may further include a first set of one or more side support poles extending from a first side of the platform assembly to a first side tent wall top edge, and a corresponding second set of one or more side support poles extending from a second opposing side of the platform assembly to a second side tent wall top edge. The tent assembly may also include a set of one or more collapsible top support poles extending substantially between the first and second side tent wall top edges. Each top support pole may further include a first end coupled to a top portion of one of the first side support poles, and a second end coupled to a top portion of one of the second side support poles. Each top support pole may also include a hinge point disposed between the first and second ends.

The tent assembly may, in some embodiments, be configured to transition from a deployed state to a closed state by, for example, operatively folding the top support poles downward at the hinge point, thereby moving the top portion of each support pole and the side tent wall top edges inward towards a center of the tent assembly, and transitioning the platform assembly from the open position to the closed position such that the tent walls, side support poles, and top support poles are disposed between the static platform and dynamic platform.

In some embodiments, the tent assembly may include a rain fly extending substantially along the top tent wall and beyond the front tent wall, back tent wall, and side tent walls. The rain fly may be coupled to one or more of the platform assembly and tent walls, or removably coupled to one or more of the platform assembly and tent walls. The rain fly may also include a vestibule positioned above a tent entrance a wall of the tent assembly, for example the front tent wall. The tent walls may also include one or more windows with or without covers. The vestibule may include a vestibule support mechanism. The tent assembly may include extensions on each side of the top support poles for, among other things, supporting the rain fly beyond the side walls. The tent assembly may transition from the deployed state to the closed state with the rain fly installed or without the rain fly installed.

In some embodiments, the tent walls, side support poles, and the top support poles and extensions are contained within a boundary formed by perimeters of the static portion and dynamic portion of the platform assembly when in the closed state. In some embodiments, the tent assembly may include an entry ladder, that may or may not be coupled or operatively coupled to the platform assembly or other tent structure. The tent assembly may, in some embodiments, include a base and be configured to be attached to and/or towed by a vehicle.

In some embodiments, the primary support poles and top support poles may be coupled together at one or more pivot connections, and the top support poles may also include a locking hinge mechanism at a point between the pivot connections. In some embodiments, first and/or second tension straps may extend from, for example, opposing corners of the dynamic platform, along the side tent wall top edges, to opposing corners of the static platform, wherein when the platform assembly is in the open position, the tension straps may pull downward on an outside portion of the pivot connections thereby imparting an upward force on an inside portion of the pivot connections and the first and second ends of the top support poles coupled thereto. The tent assembly may also include a release tab and/or release strap for selectively releasing the locking hinge(s).

A locking hinge may also be included in the disclosed tent assembly. In some embodiments, the locking hinge may include first and second tent pole receiving members, a pivot rod, and a locking mechanism for selectively locking the tent poles in a deployed configuration, and selectively releasing the tent poles in a collapsed configuration wherein the second tent pole installed in the second tent pole receiving member may be released to pivot about the pivot rod. The locking mechanism may also include a movable top portion of the second tent pole receiving member, and the pivot rod may extend through an end portion of the second tent pole. The movable top portion may be biased to a first locked configuration, and may be coupled to a release tab for operatively transitioning the movable top portion from the first locked configuration to a second released configuration. The release tab may be coupled to a strap or rope. In some embodiments, the movable top portion may also include an opening angled from a substantially open inner portion to a substantially closed outer portion. In some embodiments, as the tent pole pivots from the collapsed configuration, the second tent pole may push the movable top portion along the angled opening to transition the top portion from the locked configuration to the released configuration. The top portion may then transition back to the locked configuration upon arrival of the second tent pole at, for example, the deployed configuration.

DESCRIPTION

Figure 1:
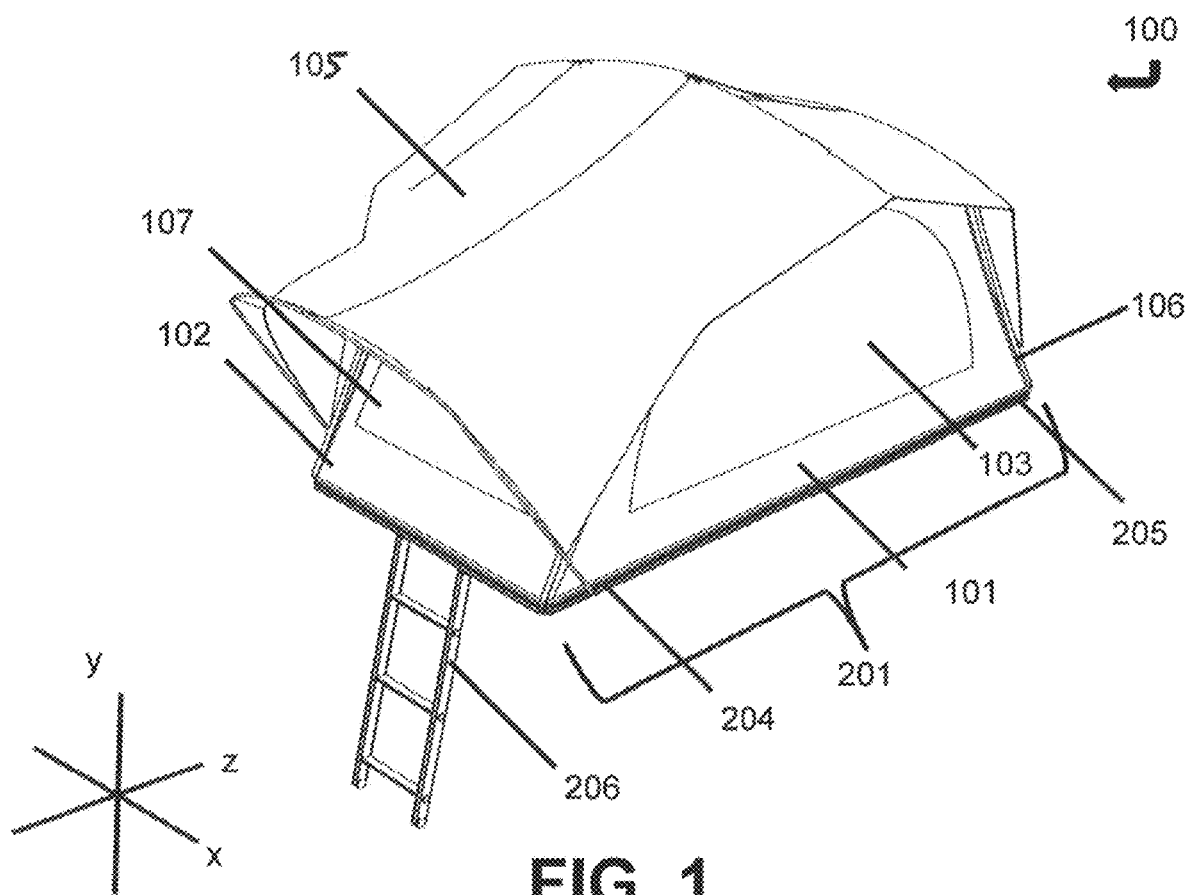
FIG. 1 is a side perspective view of an embodiment of the assembled tent with the reference axes shown and labeled.

The following description includes various embodiments and method of carrying out exemplary embodiments of the present approach. The description is not to be taken in a limiting sense, and is made merely for the purpose of illustrating the general principles of the present approach. It should be appreciated that the various components, configurations, and features described herein may be combined to form other embodiments without departing from the present approach.

FIGS. 1-4 illustrate an exemplary embodiment of an assembled tent 100 with the reference axes shown and labeled. The assembled tent 100 may include a front tent wall 102, side tent walls 101 (opposing side tent wall 101 not shown in FIG. 1), back tent wall 106, top tent wall 104, fly 105, entrance door 107, ladder 206, and/or platform assembly 201. The platform assembly 201 may include a static platform 205 and a dynamic platform 204. It should be appreciated that the assembled tent 100 may be configured into many different shapes, including but not limited to a square, a rectangle, an ovular or circular dome, a cone, etc. It should also be appreciated that the assembled tent 100 may have one continuous wall or a plurality of walls. It should be appreciated that the present approach is not intended to be limited to these embodiments, as those of ordinary skill in the art will appreciate that modifications may be made without departing from the present approach.

Figure 2:
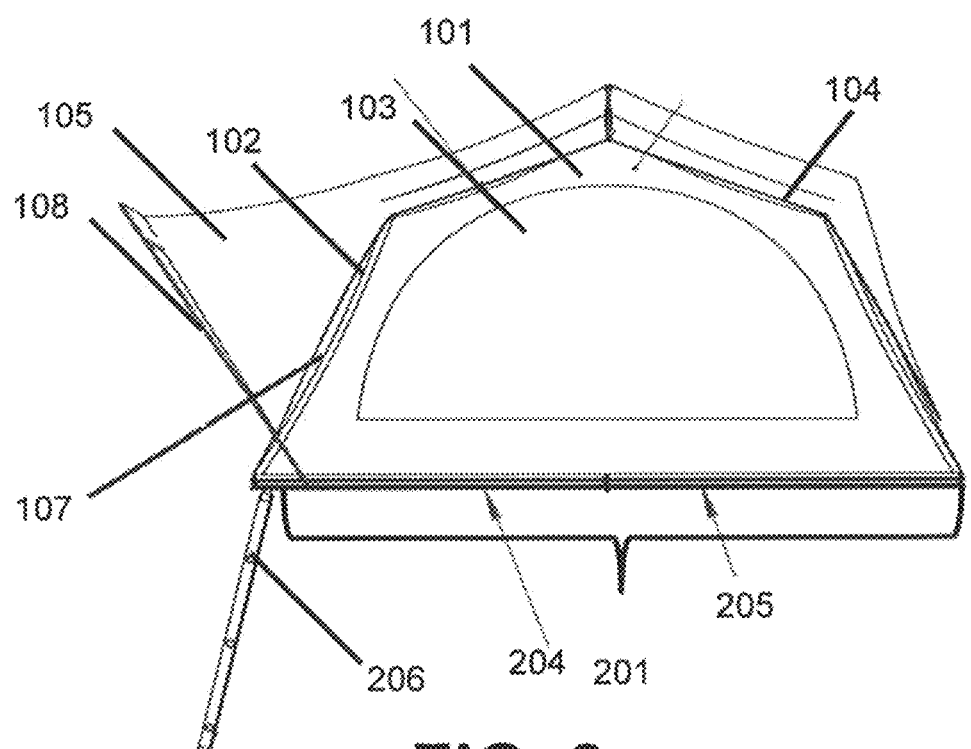
FIG. 2 is a side view of an embodiment of the assembled tent.
Figure 3:
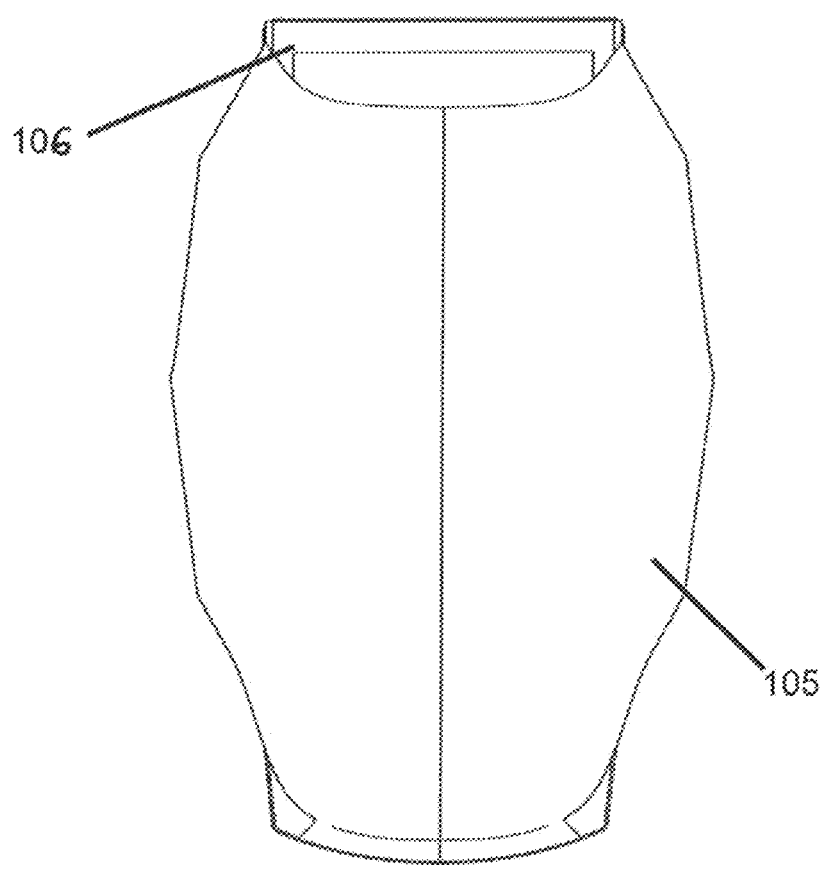
FIG. 3 is a top view of a rain fly according to one embodiment.

FIG. 2 illustrates a side view of an exemplary embodiment of an assembled tent 100. FIG. 2 shows one embodiment in which the side tent wall 101 may include a window 103. It should be appreciated that tent walls may include none or a plurality of windows 103. In some embodiments, the windows 103 may be constructed from mesh netting, a plastic (e.g., PVC), and/or any other appropriate material. In some embodiments, the windows 103 may have removeable covers. In some embodiments, the tent walls may be fabricated from nylon, canvas, or other suitable materials known in the art. FIG. 2 also illustrates a fly 105, and in some embodiments the fly 105 may be configured to include a vestibule 108 around the entrance door 107. In some embodiments, the vestibule 108 may protect the entrance door 107 and/or ladder 206 from, for example, precipitation or other elements. FIG. 3 illustrates an exemplary top view of a fly 105 covering according to one embodiment. In some embodiments, the fly 105 may be fabricated from a waterproof polyester fabric and may have a mold and/or mildew resistant coating.

Figure 4:
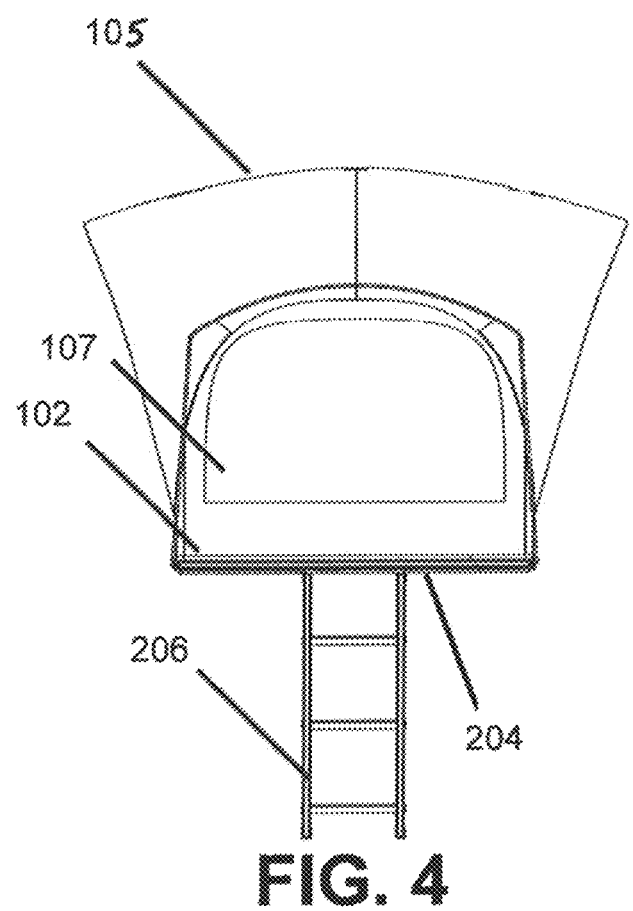
FIG. 4 is a front view of a front tent wall and ladder according to one embodiment.

FIG. 4 illustrates an exemplary front view of a front tent wall 102, entrance door 107, and ladder 206 according to one embodiment. The ladder 206 may be attached to the platform assembly 201 by any number of ways known in the art. Ladder 206 may alternatively be separate and apart from tent assembly 100, and/or operatively attachable and detachable as desired. In some embodiments, tent assembly 100 does not include a ladder.

Figure 5:
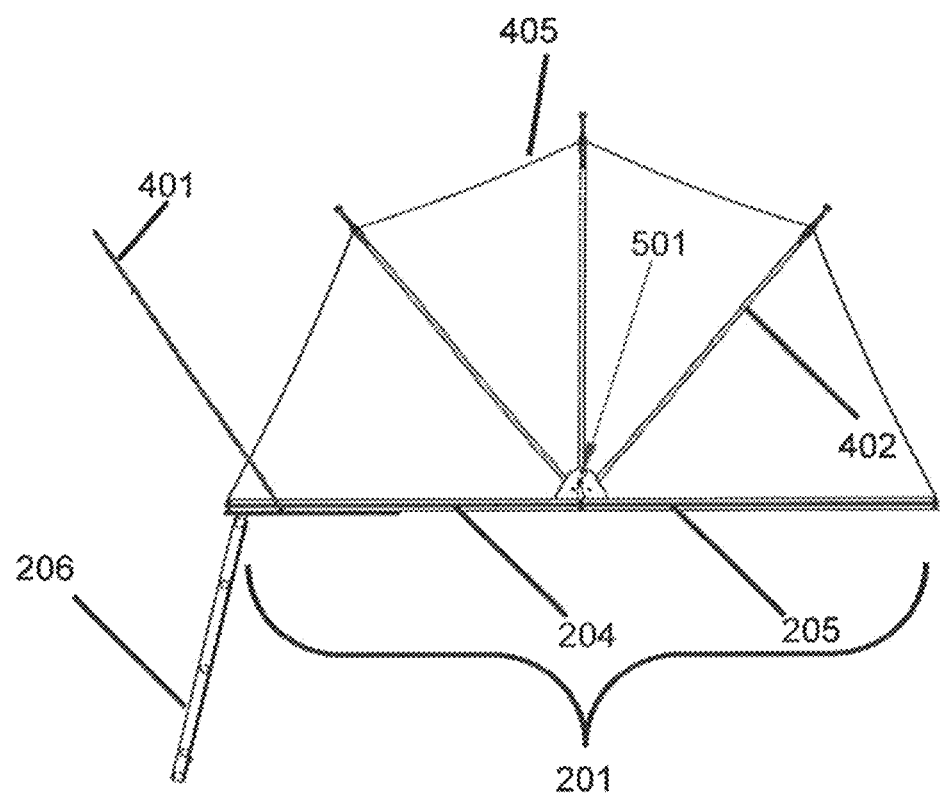
FIG. 5 is a side view of an embodiment of the assembled tent without the tent walls and fly that shows the internal construction.

FIG. 5 illustrates a side view of an embodiment of the assembled tent 100 with the tent walls and fly 105 not pictured to illustrate an exemplary embodiment of its internal construction. FIG. 5 illustrates how vestibule 108 (not shown in FIG. 5) may, in some embodiments, be formed by vestibule pole 401 which may be attached to platform assembly 201. The assembled tent 100 may have one or more primary support poles 402 on opposing sides of the assembled tent 100 to provide structure to the tent. In some embodiments, the tent assembly may include first and second sets of one or more side support poles 402 that each extend from a corresponding first side of platform assembly 201 or a second side of the platform assembly 201. Primary support poles 402 may, in some embodiments, attach to the platform assembly 201 at platform pivot 501. In some embodiments, webbing support strap 405 may provide additional support to the structure by connecting the primary support poles 402.

Figure 6:
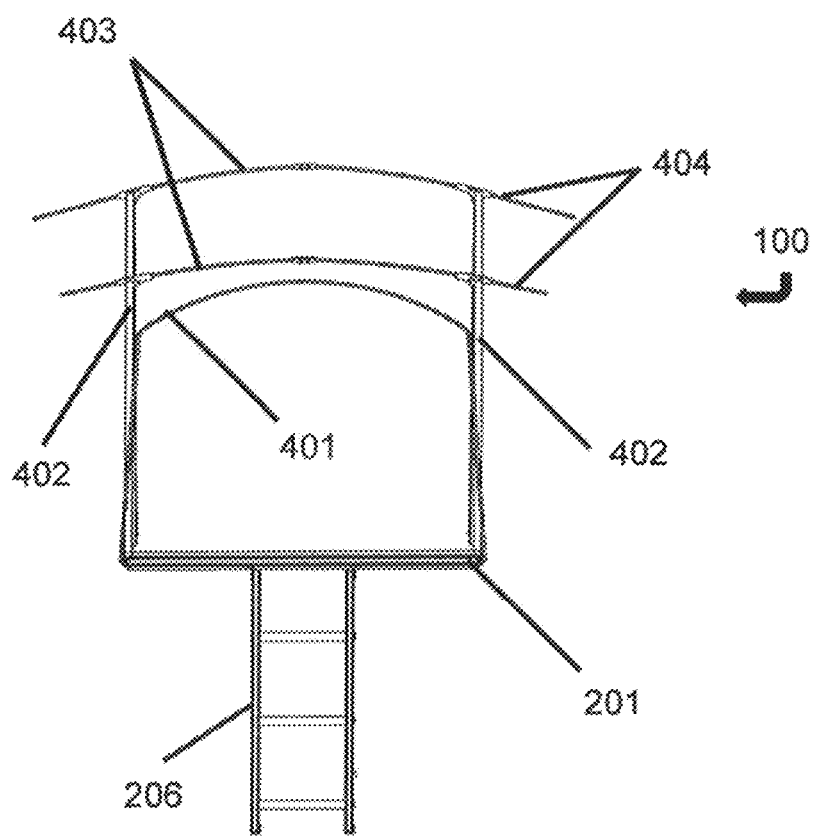
FIG. 6 is a front view of a front tent wall and ladder without the tent walls and fly to show the internal construction.

FIG. 6 is a front view of tent assembly 100 again shown with the tent walls (e.g., front tent wall 102) and fly 105 removed such that the internal construction can be shown. The tent walls may be supported by one or more primary support poles 402 that extend substantially vertically and are substantially parallel to each other on opposing sides of the tent assembly 100. In certain other embodiments, the side support poles 402 may angled partially away from one another such that tops of the support poles 402 terminate at points outside a footprint of the platform assembly 201 (i.e., the cross-sectional area of the tent at the floor (e.g., adjacent platform assembly 201) may be less than a cross-sectional area of the tent at or near the top (e.g., near top support poles 403 discussed below)).

The one or more primary support poles 402 on opposing sides of platform assembly 201 may be connected by one or more top support poles 403. In some embodiments, the top support poles 403 extend beyond the footprint of the platform assembly 201. The top support poles 403 may also include fly pole extensions 404 to provide, among other things, attachment points and/or support for the fly 105. In some embodiments, primary support poles 402, top support poles 403, and fly pole extensions 404 may be fabricated from aluminum, steel, fiberglass, and/or other materials known in the art.

Figure 7:
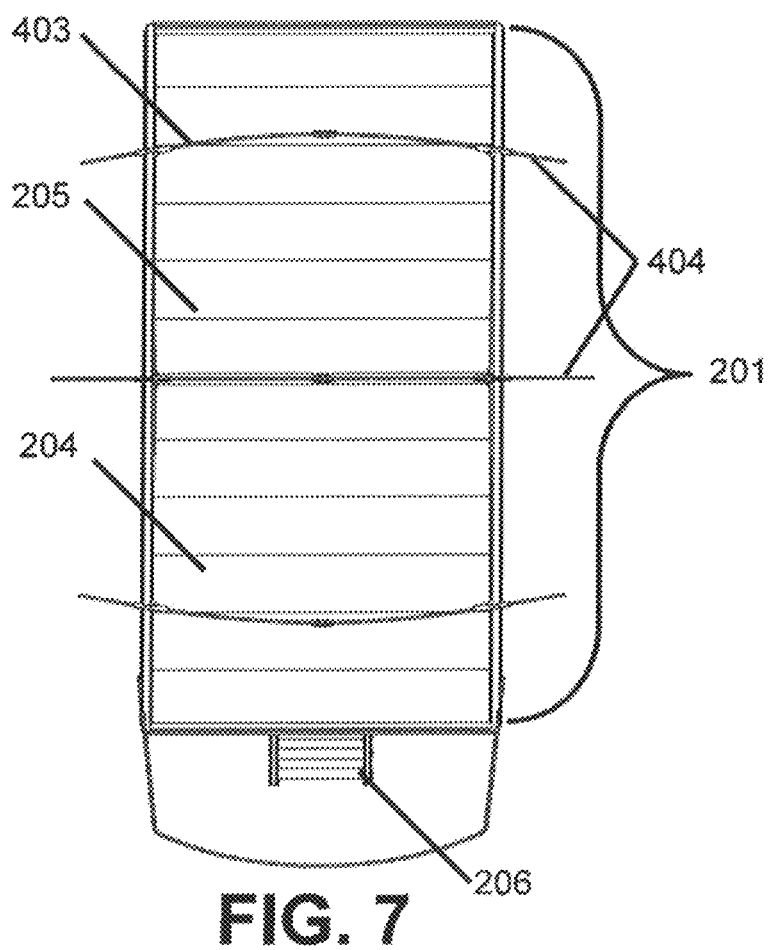
FIG. 7 is a top view of an embodiment of the assembled tent without a fly to show internal construction.

FIG. 7 is a top view of an embodiment of the assembled tent 100 without a fly 105 or top wall 104 to show internal construction. In this exemplary embodiment, three top support poles 403 and three primary support poles 402 (not shown) on each side of platform assembly 201 provide structure and support for assembled tent 100. It should be appreciated that fewer or more tent/support poles 402, 403 may be used in any number of similar or different configurations to provide structure and support.

Figure 8:
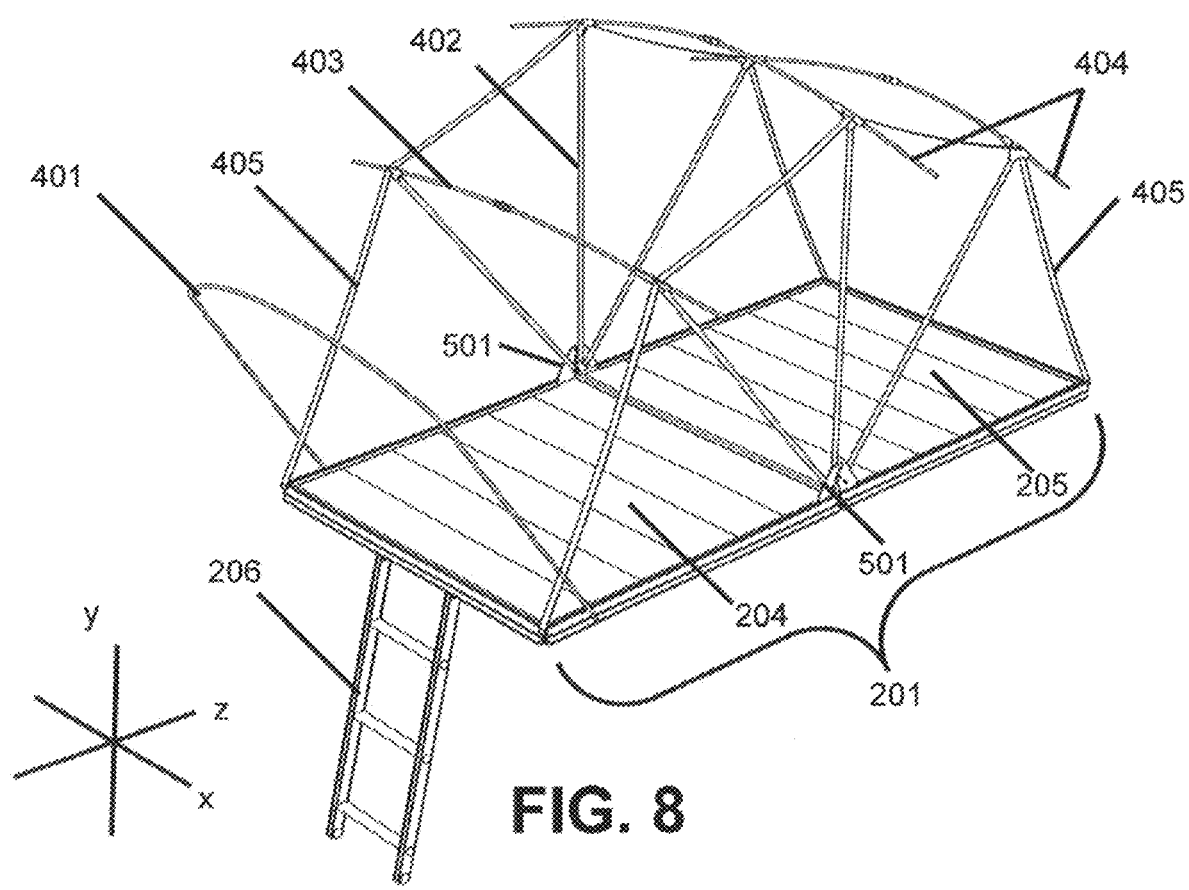
FIG. 8 is a side perspective view of an embodiment of the assembled tent without the tent walls and fly to show internal construction.

FIG. 8 provides a side perspective view of another embodiment of the assembled tent 100 without the tent walls and fly 105 depicted to show internal construction. FIG. 8 shows an exemplary embodiment in which primary support poles 402 on each side of platform assembly 201 may be connected by one or more webbing support straps 405.

Figure 9:
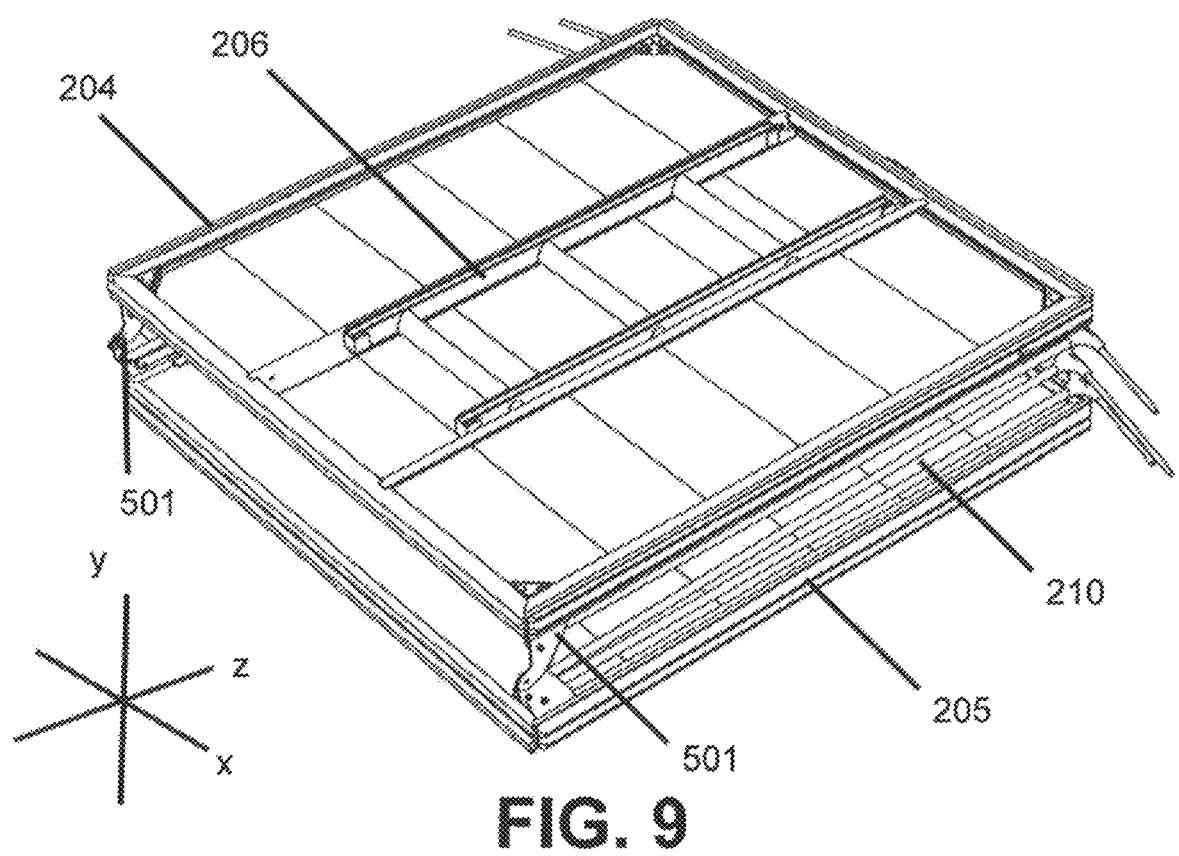
FIG. 9 is a side perspective view of an embodiment of the unassembled tent folded for storage or transport. In some embodiments, the tent poles are arranged such that the extensions 404 (see FIG. 11) are inside the storage area 210.

FIG. 9 is a side perspective view of an embodiment of the unassembled tent assembly 100 that is folded for storage or transport in, for example, a close position or closed configuration. In some embodiments, the platform assembly 201 may folded at platform pivot 501 such that the dynamic platform 204 is folded over static platform 205. In some embodiments, the primary support poles 402 and top support poles 403 may nest between the dynamic platform 204 and static platform 205 such that support poles 402, top support poles 403, the tent walls, and/or the fly are contained between and/or within the dynamic platform 204 and static platform 205 such that the only exposed portions of the tent assembly are the platforms 204/205 (i.e., the remaining components of the tent assembly are contained within a storage area 210. As pictured, fly pole extensions 405 are shown outside storage area 210, but as shown below in, for example, FIG. 11, may also be stored within storage area 210.

Figure 10:
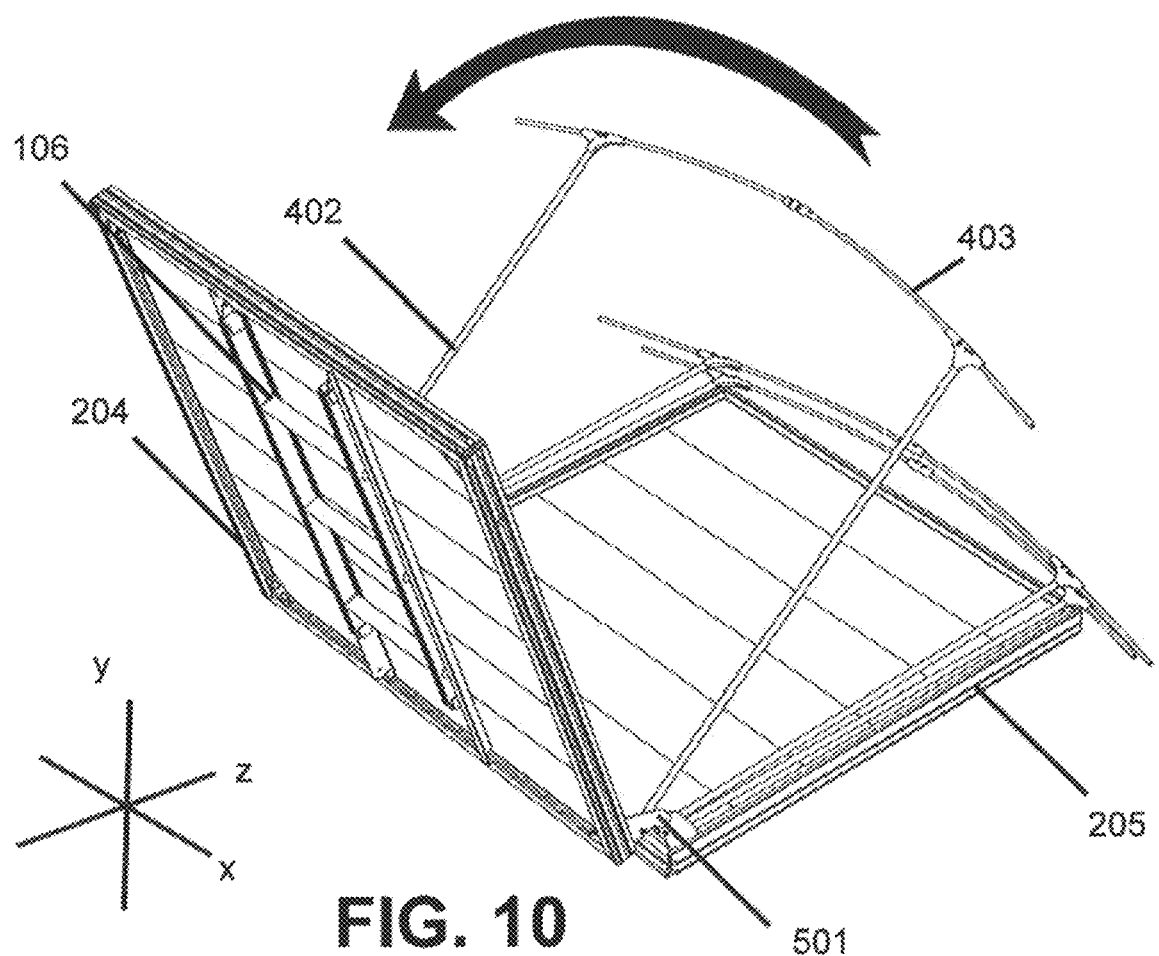
FIG. 10 is a side perspective view of an embodiment of the unassembled tent as it is unfolded.

FIG. 10 is a side perspective view of an embodiment of the tent assembly 100 that is partially unfolded. In this embodiment, the dynamic platform 204 is unfolded away from static platform 205. Dynamic platform 204 may be pivotally connected to static platform 205 and may be configured to rotate about an axis (e.g., the depicted x-axis) extending along platform pivot 501. Primary support poles 402 and top support poles 403 may also be configured to rotate about the axis along platform pivot 501.

Figure 11:
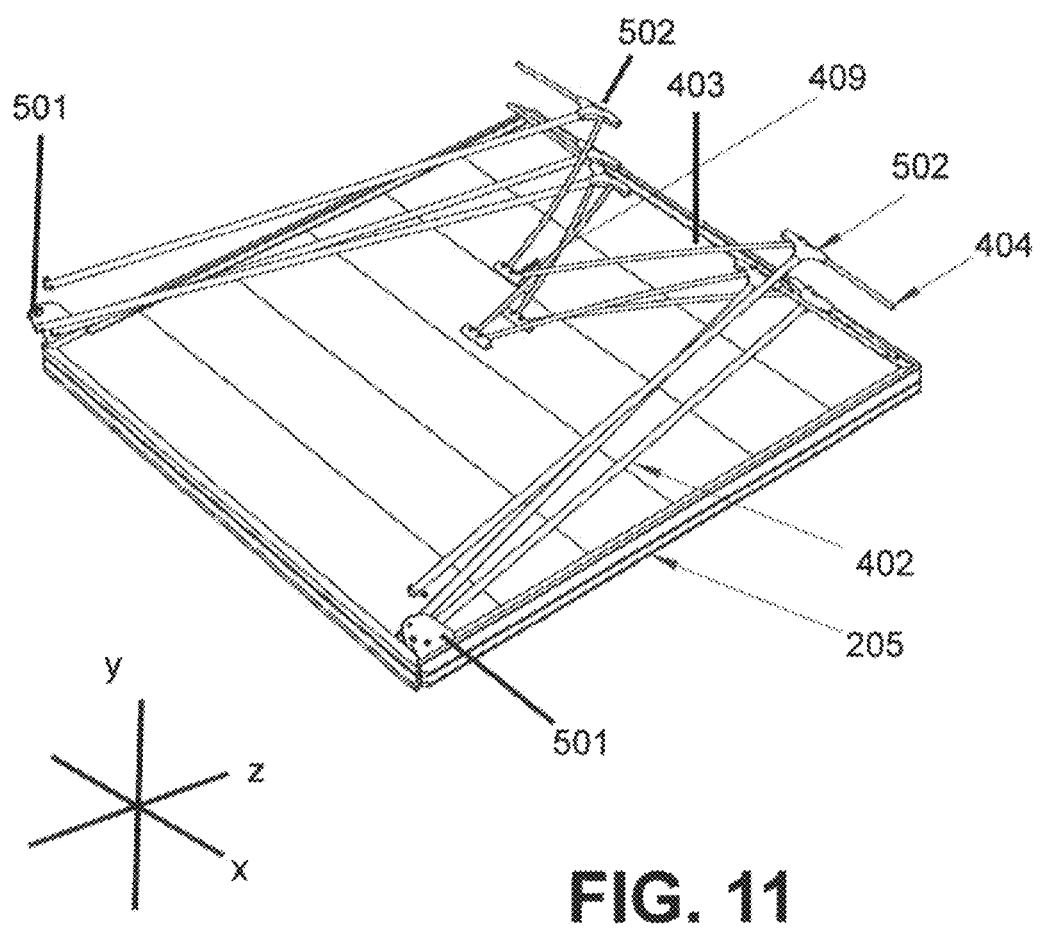
FIG. 11 is a side perspective view of an embodiment of the unassembled tent in a stored position in which the dynamic platform is removed to show the folded tent pole positions.

FIG. 11 is a side perspective view of an embodiment of the unassembled tent assembly 100 in a stored position in which the dynamic platform 204 is removed to show a configuration of primary support poles 402 and top support poles 403. In one embodiment, top support pole 403 includes one or more pivoting connections 409 that allow for compact storage. In one embodiment, the top support pole 403 may be folded at pivoting connections 409 and one or more pole connectors (e.g., pivoting connection 502) to fit entirely within the perimeter of static platform 205 when stored.

Figure 12:
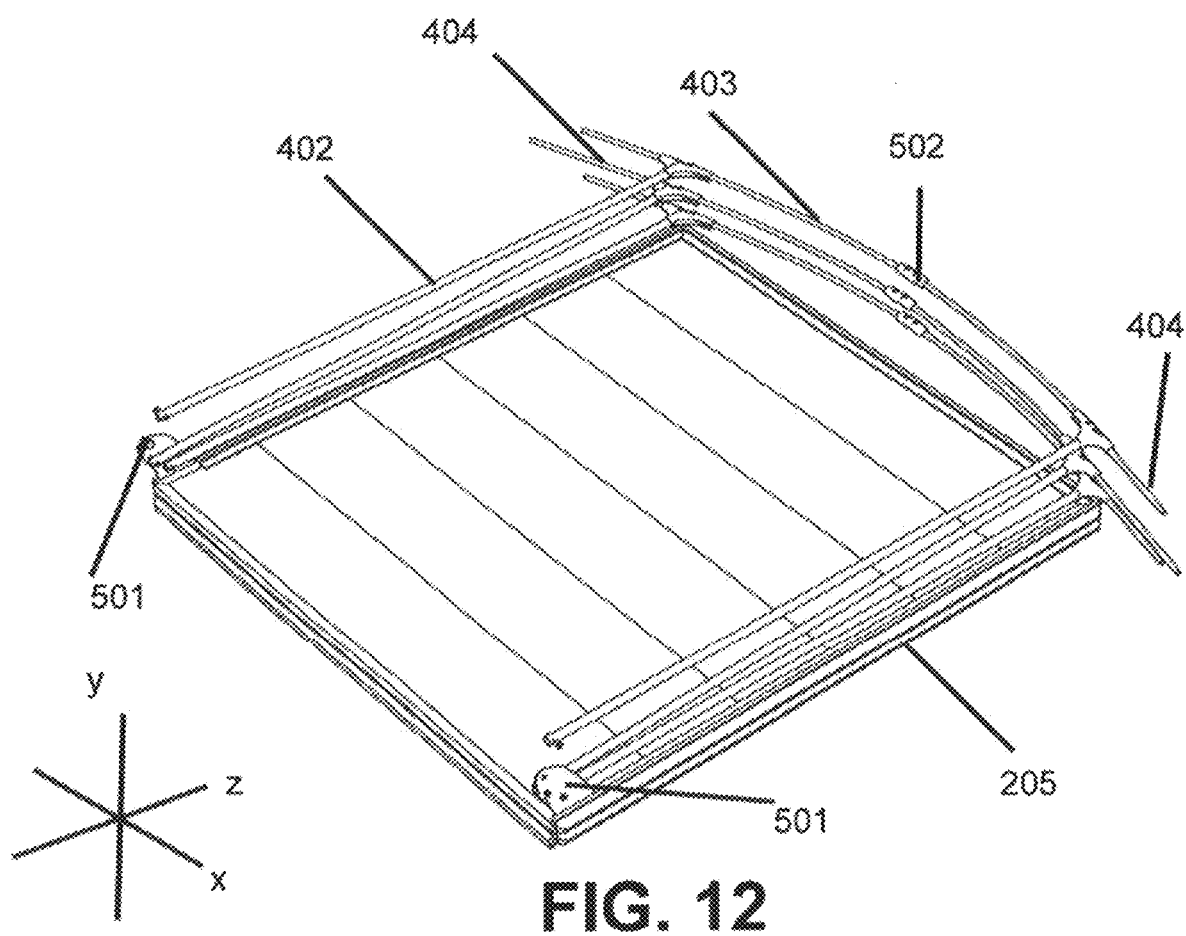
FIG. 12 is a side perspective view of an embodiment of the unassembled tent prior to unfolding in which the dynamic platform is removed to show pole structures in the extended position for supporting the tent and fly.

FIG. 12 is a side perspective view of an embodiment of the unassembled tent assembly 100 just prior to unfolding. Dynamic platform 204 is removed to show the configuration of folding tent poles 403 in an extended position for supporting the tent walls and fly 105.

Figure 13:
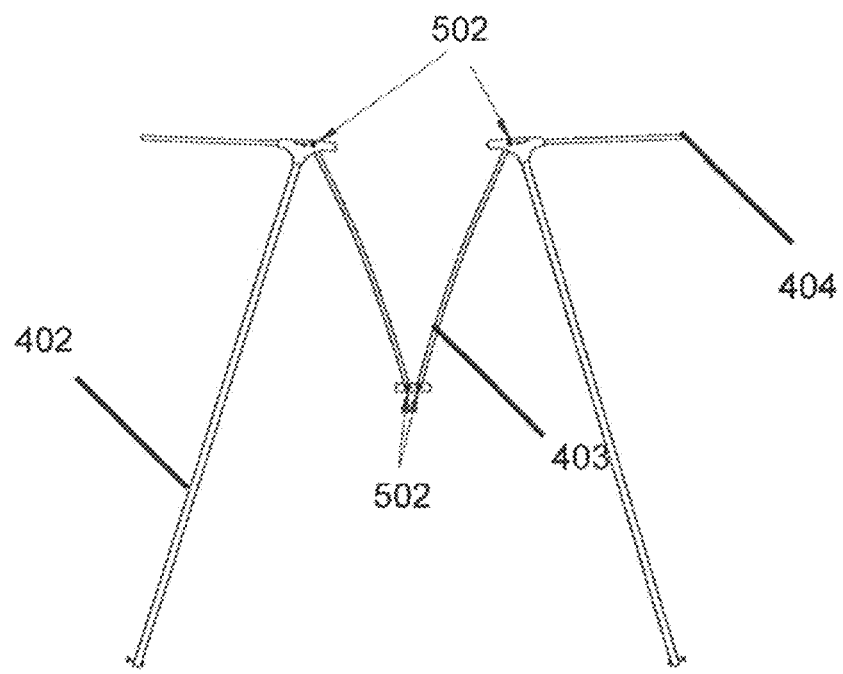
FIG. 13 is a side view of one embodiment of the tent poles in a stored position.

FIG. 13 is a side view of one embodiment of the tent poles in a folded or stored position. Primary support pole 402 may be connected to top support pole 403 by pivoting connection 502. In some embodiments, the pivoting connection on top support pole 403 may include locking hinge 2300 described in further detail below and shown in, for example, FIGS. 21-22. Further, pivoting connections 502 at tops of primary support poles 402 and ends of top support poles 403 may take on the form discussed further below with reference to FIGS. 21-22. In this embodiment, the primary support pole 402 and folding tent pole 403 may form an acute angle when in a stored position.

Figure 14:
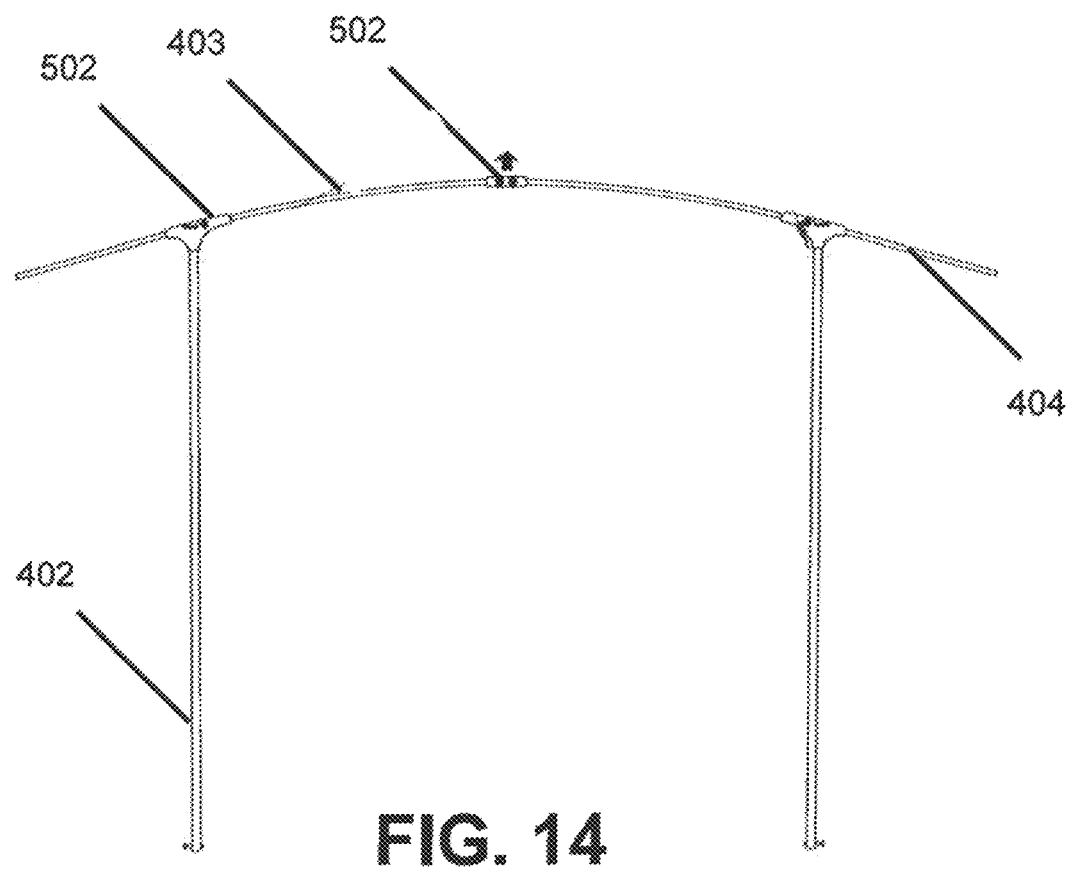
FIG. 14 is a side view of one embodiment of the tent poles in an assembled position.

FIG. 14 is a side view of one embodiment of the tent poles in an assembled position. Primary support pole 402 may be connected to folding tent pole 403 by pivoting connections 502. In this embodiment, the primary support pole 402 and folding tent pole 403 may form a right angle or obtuse angle when in an unfolded or deployed position. Tension from the tent and/or webbing support strap 405 may be used to maintain the primary support poles 402 and folding tent poles 403 erect. In will be understood that any number of other means for securing the poles in a deployed configuration may also be employed.

Figure 15A:
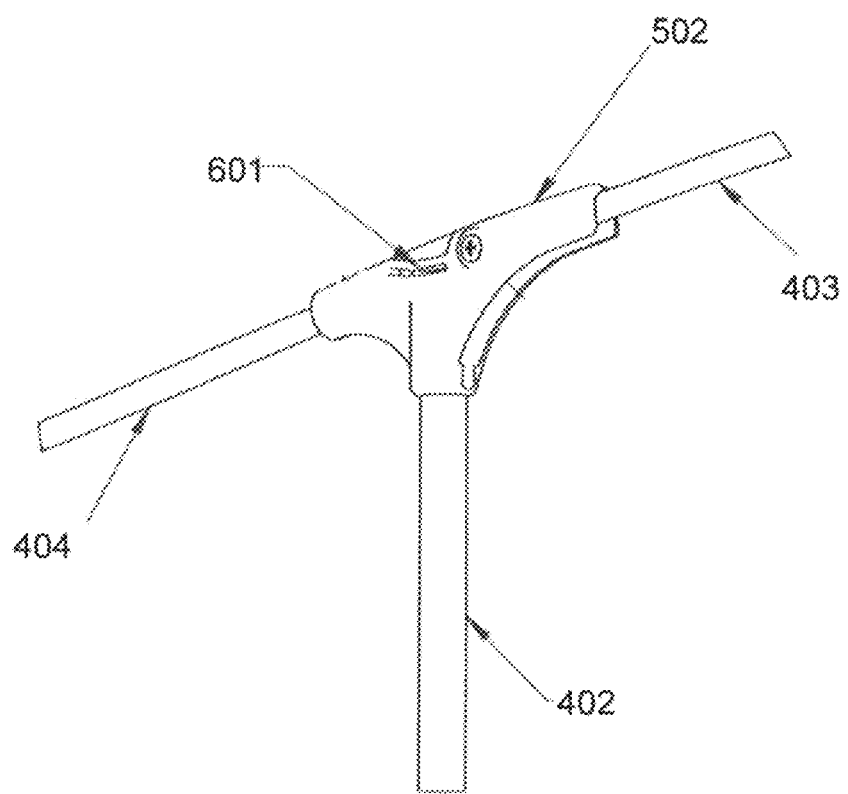
FIG. 15A is a side view of one embodiment of the tent poles in an assembled position.
Figure 15B:
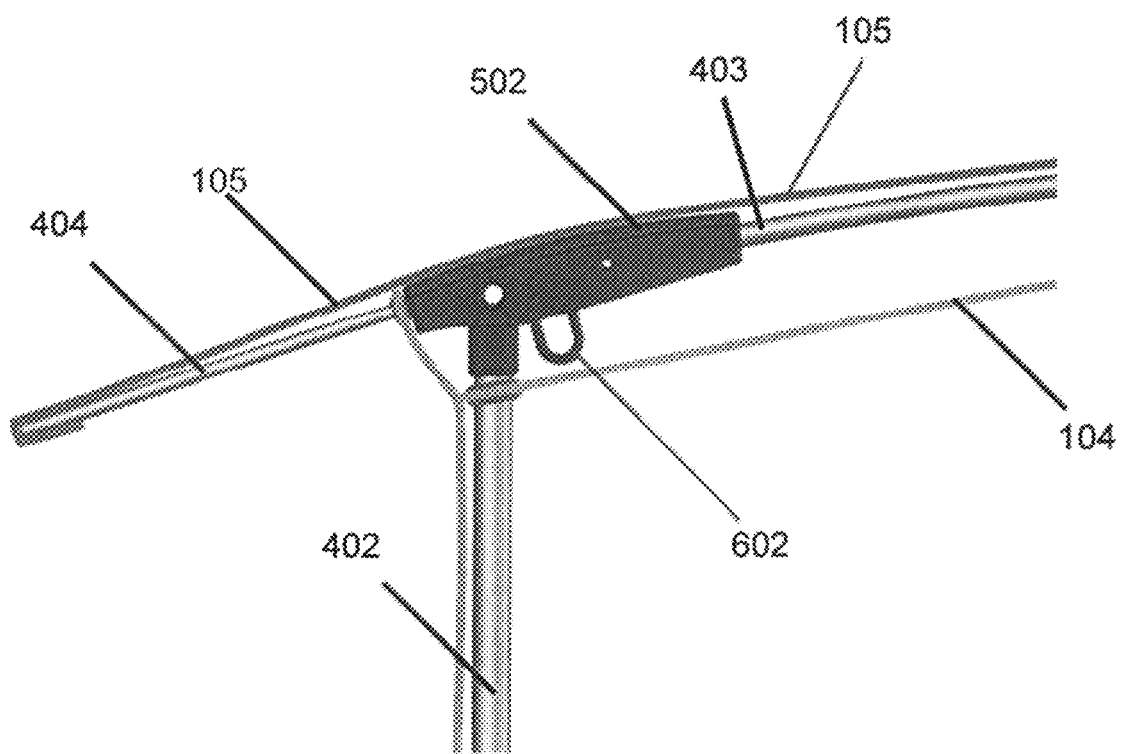
FIG. 15B is a side view of one embodiment of the tent poles in an assembled position in which the fly and tent are shown.

FIG. 15A provides a closer view of one embodiment of pivoting connection 502 when the tent poles are in an assembled position. It should be appreciated that other pivoting connection shapes may be used (including those discussed hereinbelow). In some assembled embodiments, the folding tent pole 403 may be substantially parallel to the fly pole extension 404. The top support pole 403 may form a right or obtuse angle with primary support pole 402. In some embodiments, pivoting connection 502 may include a webbing slot 601 to attach webbing support strap 405 (not shown in FIG. 15A) to the tent poles. FIG. 15B is a side view of one embodiment of the tent poles in an assembled position in which the fly 105 and top tent wall 104 are shown. In some embodiments, top tent wall may alternatively be disposed on the opposite (i.e. top) side of top support pole 403. In some embodiments, pivoting connection 502 may include a molded loop 602 that may serve as an additional or alternative point of attachment to support the tent assembly 100.

Figure 16A:
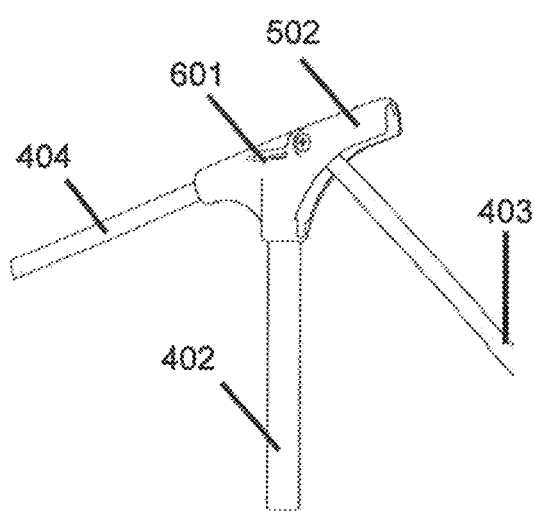
FIG. 16A is a side view of one embodiment of the tent poles in a stored position.
Figure 16B:
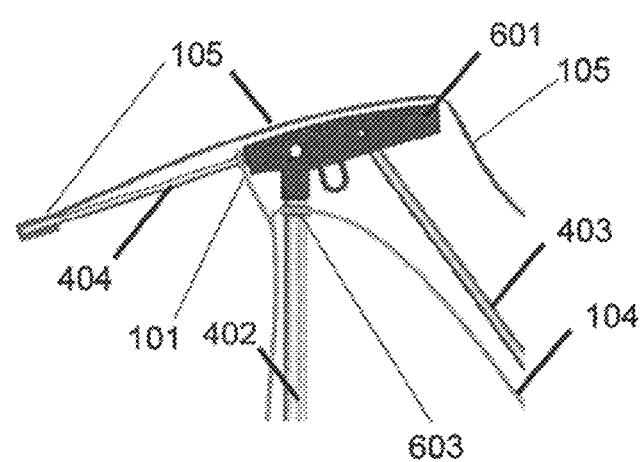
FIG. 16B is a side view of one embodiment of the tent poles in a stored position in which the fly and tent wall are shown.

FIG. 16A is a side view of one embodiment of the pivoting connection 502 when the tent poles are in a collapsed and/or stored position. In some embodiments, the top support pole 403 may form an acute angle with primary support pole 402. FIG. 16B is a side view of one embodiment of the tent poles in a stored position in which the fly 105 and top tent wall 104 are shown. FIG. 16B shows that the fly 105 may attach permanently to an end portion of fly pole extension 404. FIG. 16B shows that primary support pole 402 may pass through a grommet 603 in top tent wall 104.

Figure 17:
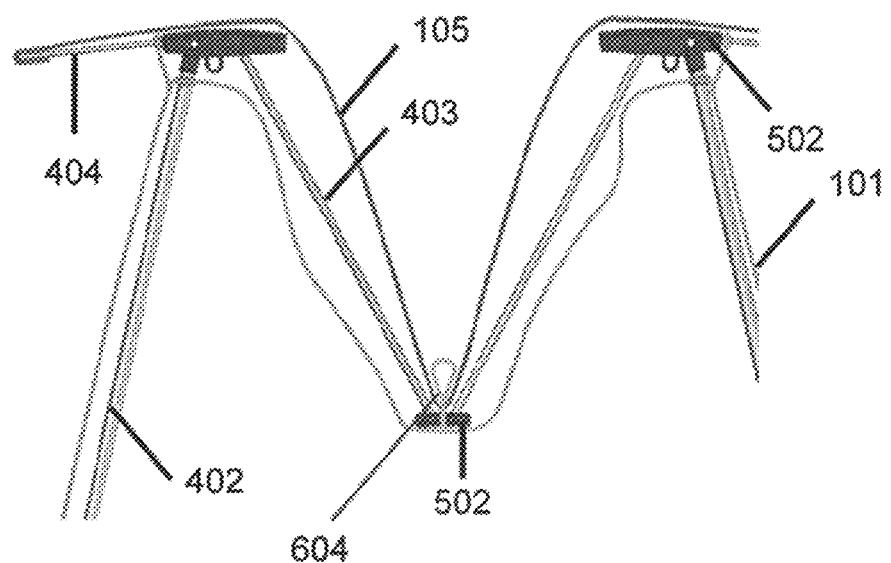
FIG. 17 is a front view of one embodiment of the outer loop of the tent assembly.

FIG. 17 is a front view of one embodiment of the outer loop 604 of the tent assembly 100. In some embodiments, the outer loop 604 may attach to a pivoting connection 502 within the tent. The outer loop 604 may be attached to the pivoting connection 502 by any manner of ways known in the art. In some embodiments, a user merely pulls the outer loop 604 to extend the top support poles 403 to assemble the tent.

Figure 18:
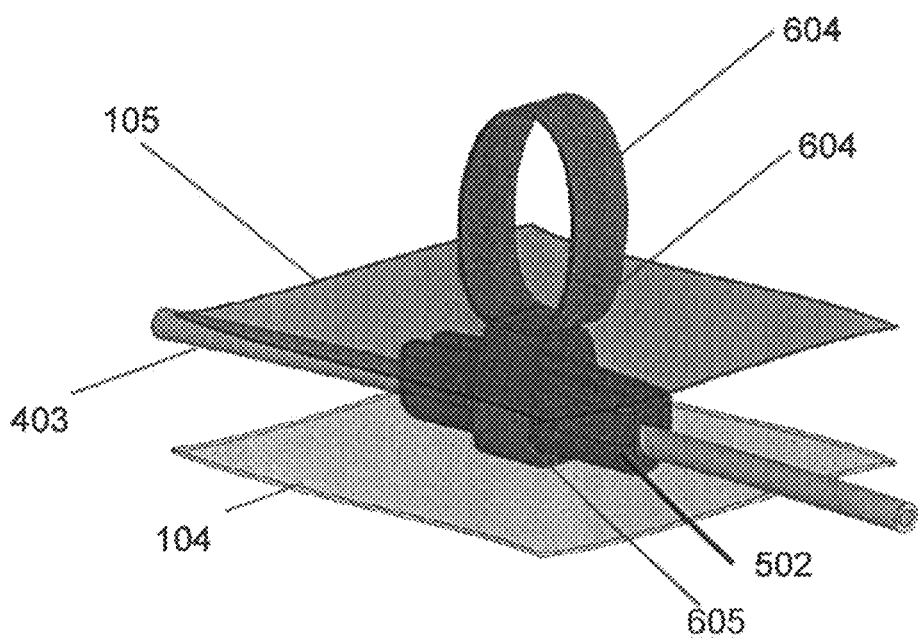
FIG. 18 is a side perspective view of one embodiment of the outer loop.

FIG. 18 is a side perspective view of one embodiment of the outer loop 604. In one embodiment, outer loop 604 may be attached to pivoting connection 502 by means of an inner loop 605. In one embodiment, outer loop 604 is sewn through fly 105 to second loop 605 located beneath fly 105.

Figure 19:
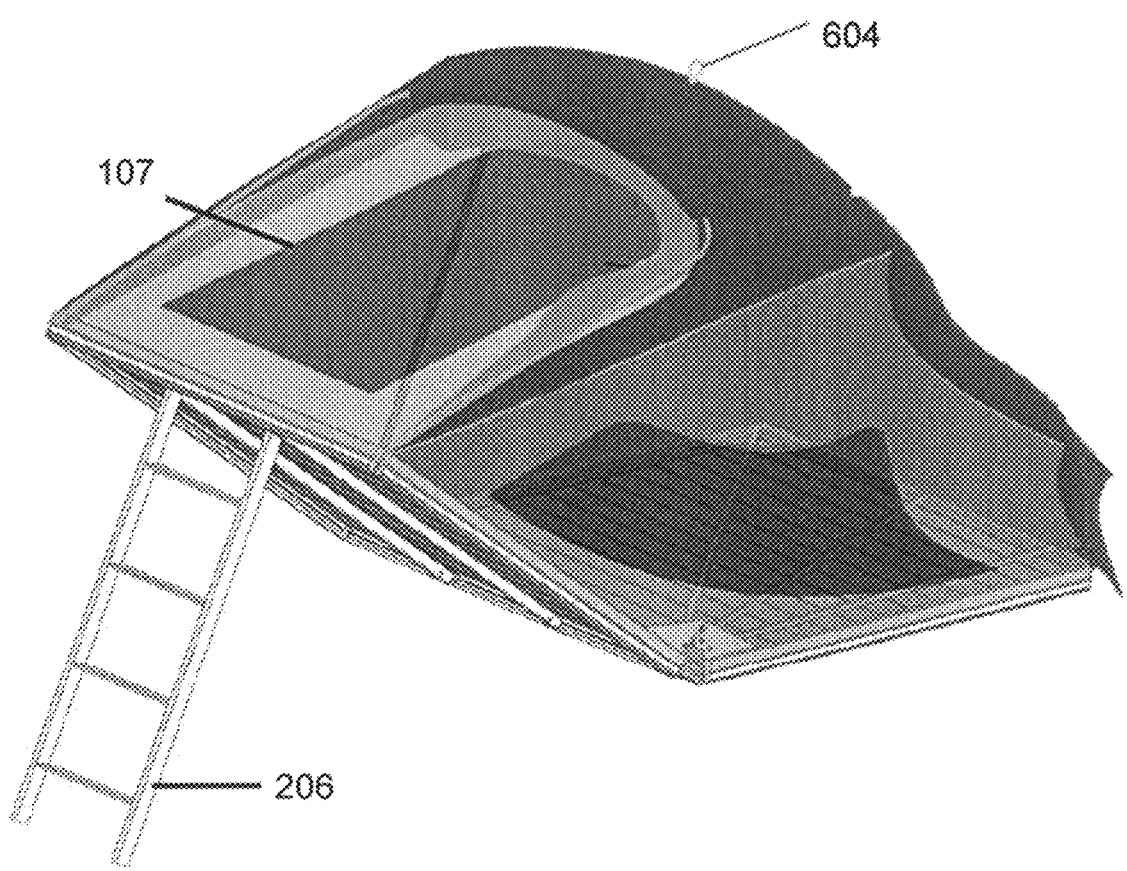
FIG. 19 is a side perspective view of a partially deployed tent assembly.

FIG. 19 is a side perspective view of a partially deployed tent assembly 100. In some embodiments, outer loop 604 may be pulled to assemble the tent in whole or in part.

Figures 20A, 20B:
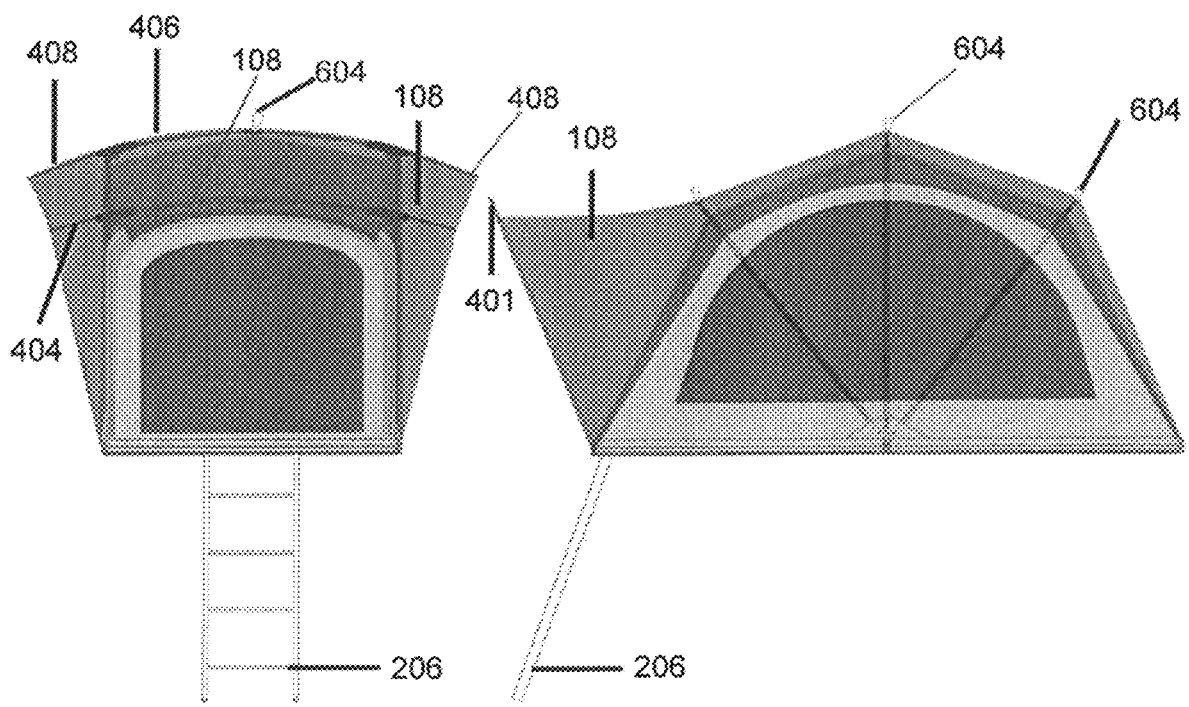
FIG. 20A is a front view of fully deployed tent assembly.
FIG. 20B is a side view of fully deployed tent assembly.

FIG. 20A is a front view of fully deployed tent assembly 100 showing the placement of outer loop 604. In some embodiments, peak fly pole extension 408 may be longer than the other fly pole extensions 404 for stylistic purposes, to provide rain shelter, and/or to provide ventilation. FIG. 20B is a side view of fully deployed tent assembly 100. In some embodiments, tent assembly 100 may have one or more outer loops 604, and include vestibule 108.

Thus, to assemble tent assembly 100 in some embodiments, a user may start with the tent assembly 100 as shown in FIGS. 9-10. The user may pull, in a y-axis direction, on an outer loop 604 which is connected to a pivoting connection 502 on the top support poles 403. As force is applied, the folding tent pole 403 will open from a folded configuration, as shown for example in FIG. 11, to an open configuration, as shown for example in FIG. 12. A user may then lift dynamic platform 204 away from static platform 205 and about platform pivot 501. The tent assembly 100 may be fully assembled when dynamic platform 204 is substantially parallel and in the same xz plane as static platform 205. Lifting outer loop 604 for each top support pole 403 may then result in the tent being deployed.

In certain alternative embodiments, outer loop 604 is not included in tent assembly 100. Rather than a user pulling an outer loop 604, for example, top support poles 403 and primary support poles 402 may attain their deployed configuration (such as, for example, deployed configuration depicted in FIG. 8 or FIGS. 20A-20B) by a user simply transitioning dynamic platform 204 from the closed configuration (illustrated for example in FIGS. 9-11) to the open configuration illustrated, for example, in FIG. 8. In some embodiments, webbing strap 405 may provide sufficient force to deploy top support poles 403. For example, as illustrated in FIG. 8, webbing straps 405 may be configured to run along each side of tent assembly 100, and attach on respective corners of dynamic platform 204 and static platform 205, and at pivot connections 502 at the top of each primary support pole 402.

Figure 21:
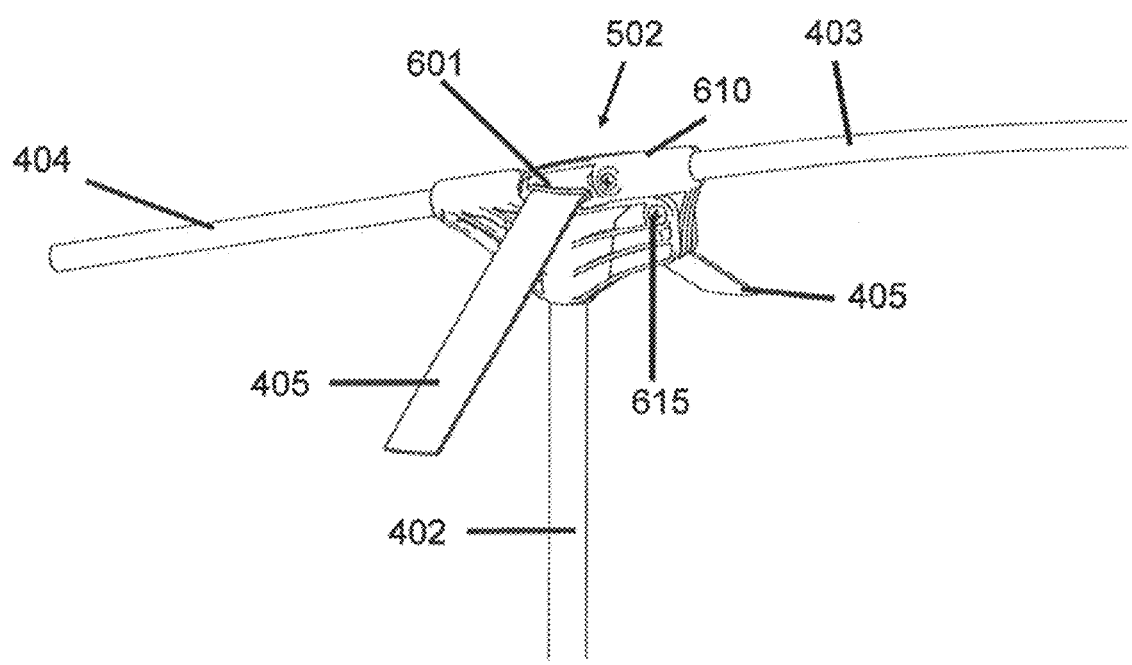
FIG. 21 is a side view of a pivot connection in a first configuration according to some embodiments.
Figure 22:
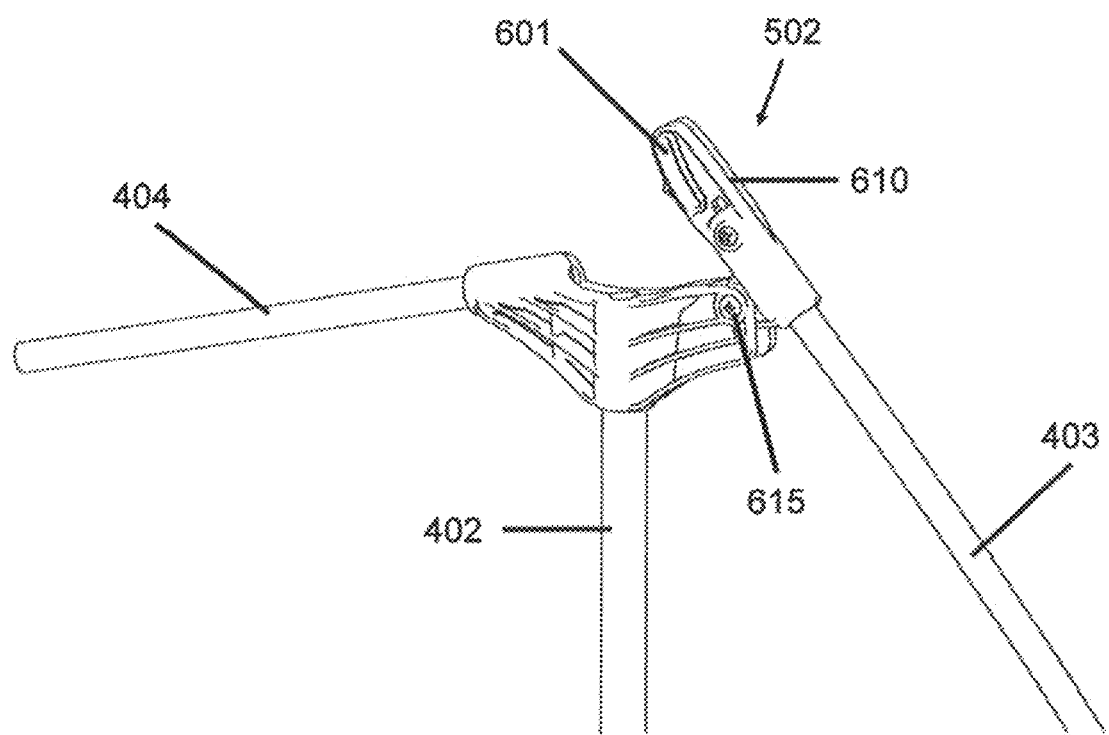
FIG. 22 is a side view of the pivot connection in FIG. 21 in a second configuration according to some embodiments.

For example, with reference now to FIGS. 21-22, webbing strap 405 may run through a slot 601. When the platform assembly 201 is opened, the tent walls (e.g., side tent walls 101) unfold in, for example, an accordion-like manner and cause primary support poles 402 to rotate to their respective substantially upright positions (see, e.g., FIG. 8). As the tent walls unfold and the primary support poles 402 stand upright, tension in webbing strap 405 may increase, thereby imparting a downward force on a rotatable portion 610 of connection 502. That downward force may cause pivot connection 502 to pivot about the pivot point 615, thereby imparting an upward force on top support pole 403. When the tension on webbing strap 405 is released (for example, when folding platform assembly 201 back towards its closed configuration), the upward force on top support poles 403 may be removed, thereby enabling them to fold back down to a closed configuration (as shown for example in FIG. 11). Accordingly, in some embodiments, a user may deploy the tent assembly simply by pivoting the dynamic platform 204 about platform pivot 501. In some embodiments, the tent may lock in the deployed state by locking the platform in the open position (thereby maintaining tension on the webbing strap 405 and the downward force on rotatable portion 610 of connection 502). In certain other embodiments, pivot connection 502 may lock in place when transitioned to a deployed configuration, and a release mechanism may be provided to operatively release pivot connection 502. In some embodiments, top support poles 403 may lock in place, at least in part, via a locking hinge 2300, discussed in further detail below.

Figure 23:
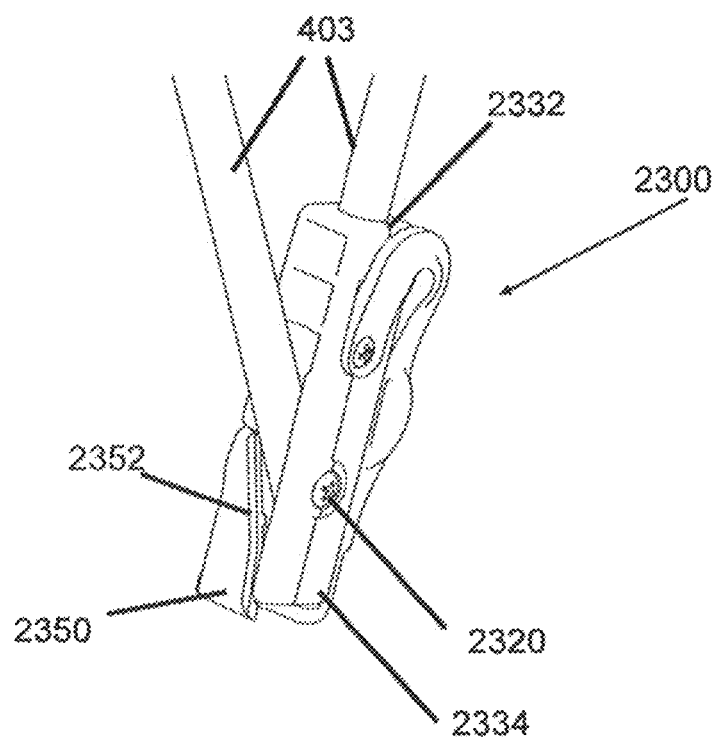
FIG. 23 is a perspective view of a locking hinge in a closed or folded configuration according to some embodiments.
Figure 24:
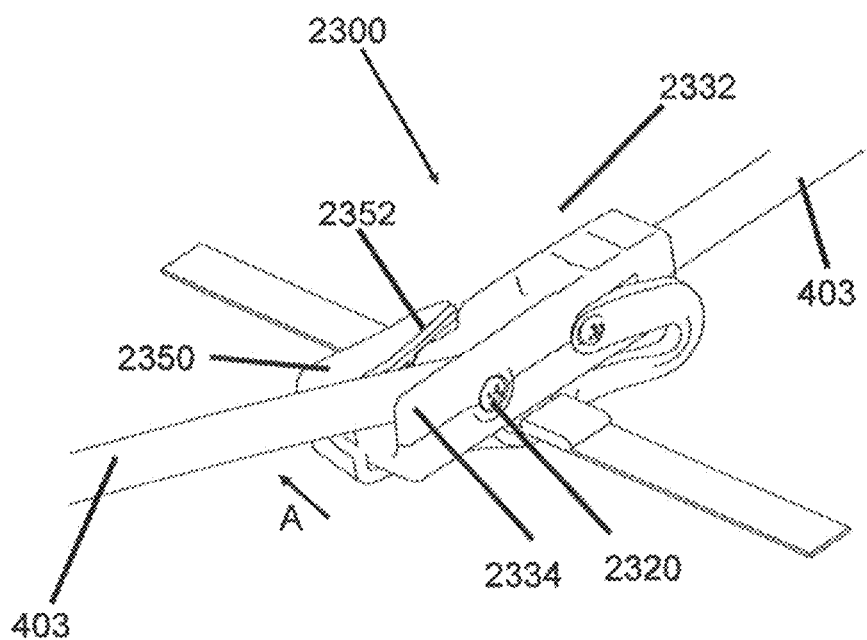
FIG. 24 is a perspective view of the locking hinge in FIG. 23 transitioning from a closed or folded configuration to an open or locked configuration according to some embodiments.
Figure 25:
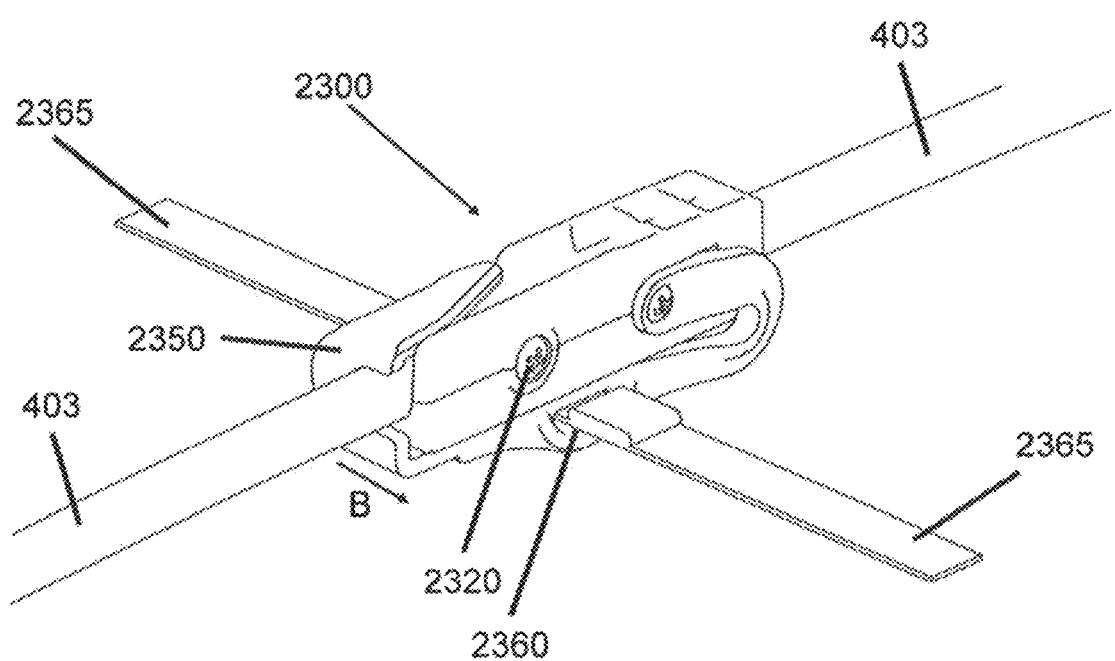
FIG. 25 is a perspective view of the locking hinge depicted in FIGS. 23-24 in an open or locked configuration according to some embodiments.

Referring now to FIGS. 23-25, an alternative embodiment of the pivoting connection 409 shown for example in FIG. 8 is disclosed. For example, pivoting connection 409 may take the form of locking hinge 2300, which may be disposed on top support pole 403. In some embodiments, locking hinge 2300 is disposed on top support pole 403 at substantially a mid-point. Locking hinge 2300 may include a pivot point 2320. In some embodiments, locking hinge 2300 may include a first tent pole receiving member 2332, and second tent pole receiving member 2334. In some embodiments, opposing ends of top support pole 403 may be received by first and second tent pole receiving members 2332, 2334. Locking hinge 2300 may also include locking mechanism 2350. In some embodiments, locking mechanism 2350 may form a part of second tent pole receiving member 2334. In some embodiments, locking mechanism 2350 may be biased to a locked position shown in FIGS. 23 and 25. The bias force may be applied by any appropriate means, including for example a spring force, magnetic force, or a force applied by the material making up the locking mechanism such that when locking mechanism 2350 is displaced out of the locking position (for example, in the direction A shown in FIG. 24), the material applies a force tending to return it to the locked position (i.e. a force in the direction B shown in FIG. 25).

In the unlocked or open configuration illustrated for example in FIG. 23, top support pole 403 is in its folded or collapsed configuration as shown for example in FIG. 11. In some embodiments, when tent assembly 100 may be unfolded from the closed configuration in FIG. 11 to the open configuration in FIG. 8, the webbing strap 405 may impart the downward force on pivot connection 502 and thereby impart an upward force on top support pole 403 such that the top support pole 403 and locking hinge 2300 transition from the folded state pictured for example in FIG. 23 to the transitioning state shown for example in FIG. 24, and ultimately the locked configuration shown for example in FIG. 25.

Referring now to FIG. 24, as the top support pole 403 transitions from the closed configuration (e.g., FIG. 23) to the open configuration (e.g., FIG. 25), the top support pole 403 inserted in second tent pole receiving member 2334 may rotate about pivot point 2320. In doing so, top support pole 403 may engage with locking mechanism 2350, and more particularly, with angled portion 2352 of locking mechanism 2350, thereby pushing locking mechanism 2350 to one side. In some embodiments, locking mechanism 2350 is configured to move or slide in a direction substantially perpendicular to support pole 403 (for example, direction A indicated in FIG. 24).

Once support pole 403 moves to the fully deployed position shown in FIG. 25 (and for example in FIG. 8), support pole 403 may no longer engage locking mechanism 2350 along the angled edge 2352, and locking mechanism 2350 may return to the locked configuration. In some embodiments, the locking mechanism 2350 may cover support pole 403 and prevent it from pivoting about pivot point 2320, thereby maintaining support pole 403 in an open, deployed configuration (as shown for example in FIG. 8). In some embodiments, locking mechanism 2300 locks top support pole 403 when the dynamic platform is transitioned to the open configuration (e.g., FIG. 8) and tension strap 405 is pulled tight, thereby transitioning top support pole 403 to the open, engaged configuration.

Locking hinge 2300 may also include a release mechanism for selectively disengaging the locking hinge and enabling top support pole 403 to fold back to the closed configuration. In some embodiments, a release tab 2360 may be included that is coupled to locking mechanism 2350 and configured to transition locking mechanism 2350 from the locked position (for example in FIG. 25) to the open position (for example, as shown in FIG. 24), thereby enabling support pole 403 to transition to its closed or folded configuration. In some embodiments, a release strap 2365 may be included to enable a user to release the locking hinge if disposed, for example, out of easy reach. For example, in some embodiments, a release strap 2365 may be coupled to release tab 2360 via a rope or other appropriate mechanism to enable a user to operatively release the locking hinges.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "substantially adjacent" means that the platforms are substantially coplanar with respect to one another.

The present approach may be embodied in other specific forms without departing from the spirit or essential characteristics thereof. The disclosed embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein. One of ordinary skill in the art should appreciate that numerous possibilities are available, and that the scope of the present approach is not limited by the embodiments described herein.

What is claimed is:

1. A tent assembly comprising:
   a front tent wall, a back tent wall, a top tent wall, first and second side tent walls, and a folding platform assembly comprising a static platform and a dynamic platform coupled together at a platform pivot, wherein the dynamic platform is configured to pivot about the platform pivot from a closed position wherein the dynamic platform is disposed substantially above the static platform, to an open position wherein the dynamic platform is disposed substantially adjacent the static platform such that the dynamic platform and static platform together form a tent bottom surface;
   a first set of one or more side support poles extending from a first side of the platform assembly to a first side tent wall top edge;
   a corresponding second set of one or more side support poles extending from a second opposing side of the platform assembly to a second side tent wall top edge;
   a set of one or more collapsible top support poles extending substantially between the first and second side tent wall top edges, each top support pole comprising a first end coupled to a top portion of one of the first side support poles, and a second end coupled to a top portion of one of the second side support poles, and each top support pole further comprising a hinge point disposed between the first and second ends;
   wherein the tent assembly is configured to transition from a deployed state to a closed state by operatively folding the top support poles downward at the hinge point, thereby moving the top portion of each support pole and the side tent wall top edges inward towards a center of the tent assembly, and transitioning the platform assembly from the open position to the closed position such that the tent walls, side support poles, and top support poles are disposed between the static platform and dynamic platform.

2. The tent assembly of claim 1 further comprising a rain fly extending substantially along the top tent wall and beyond the front tent wall, back tent wall, and side tent walls.

3. The tent assembly of claim 2, wherein the rain fly is coupled to one or more of the platform assembly and tent walls.

4. The tent assembly of claim 2, wherein the rain fly is removably coupled to one or more of the platform assembly and tent walls.

5. The tent assembly of claim 2, wherein the rain fly further comprises a vestibule positioned above a tent entrance in the front tent wall.

6. The tent assembly of claim 5, further comprising a vestibule support mechanism.

7. The tent assembly of claim 2 further comprising extensions on each side of the top support poles for supporting the rain fly beyond the side walls.

8. The tent assembly of claim 7 wherein the tent walls, side support poles, and the top support poles and extensions are contained within a boundary formed by perimeters of the static portion and dynamic portion of the platform assembly when in the closed state.

9. The tent assembly of claim 2, wherein the tent assembly can transition from the deployed state to the closed state with the rain fly installed.

10. The tent assembly of claim 1, wherein the tent walls further comprise one or more windows.

11. The tent assembly of claim 1 further comprising an entry ladder, wherein a top portion of the entry ladder is configured to be coupled to the platform assembly.

12. The tent assembly of claim 1, wherein the static platform is coupled to a vehicle.

* * * * *